US007057390B1

(12) United States Patent
Sinkine et al.

(10) Patent No.: US 7,057,390 B1
(45) Date of Patent: Jun. 6, 2006

(54) LINEAR BEAM RASTER MAGNET DRIVER BASED ON H-BRIDGE TECHNIQUE

(75) Inventors: Nikolai I. Sinkine, Newport News, VA (US); Chen Yan, Yorktown, VA (US); Cornelis Apeldoorn, Gloucester, VA (US); Jeffrey Glenn Dail, Poquoson, VA (US); Randolph Frank Wojcik, Yorktown, VA (US); William Gunning, Newport News, VA (US)

(73) Assignee: Southeastern Univ. Research Assn., Newport News, VA (US)

( * ) Notice: Subject to any disclaimer, the term of this patent is extended or adjusted under 35 U.S.C. 154(b) by 95 days.

(21) Appl. No.: 10/945,408

(22) Filed: Sep. 20, 2004

(51) Int. Cl.
*G01V 3/00* (2006.01)
*H05B 37/02* (2006.01)

(52) U.S. Cl. ...................... 324/318; 324/313; 324/322; 324/316; 315/209 R

(58) Field of Classification Search ..................... None

See application file for complete search history.

(56) References Cited

U.S. PATENT DOCUMENTS

| | | | | |
|---|---|---|---|---|
| 4,820,986 | A * | 4/1989 | Mansfield et al. | 324/322 |
| 4,920,470 | A * | 4/1990 | Clements | 363/21.11 |
| 5,063,338 | A * | 11/1991 | Capel et al. | 318/685 |
| 5,530,639 | A * | 6/1996 | Schulz et al. | 363/17 |
| 5,703,490 | A * | 12/1997 | Kennedy | 324/650 |
| 6,002,256 | A * | 12/1999 | Slade | 324/322 |
| 2004/0066153 | A1* | 4/2004 | Nemirow et al. | 315/291 |

* cited by examiner

*Primary Examiner*—Tuyet Thi Vo

(57) ABSTRACT

An improved raster magnet driver for a linear particle beam is based on an H-bridge technique. Four branches of power HEXFETs form a two-by-two switch. Switching the HEXFETs in a predetermined order and at the right frequency produces a triangular current waveform. An H-bridge controller controls switching sequence and timing. The magnetic field of the coil follows the shape of the waveform and thus steers the beam using a triangular rather than a sinusoidal waveform. The system produces a raster pattern having a highly uniform raster density distribution, eliminates target heating from non-uniform raster density distributions, and produces higher levels of beam current.

3 Claims, 7 Drawing Sheets

(PRIOR ART)

Fig. 1 x and y profiles of the Hall C Lissajous raster pattern (1994 – 2002)

(PRIOR ART)

Fig. 2 Density histogram of the Hall C Lissajous raster pattern (1994 – 2002)

Fig. 3 x and y profiles of the density distribution of the Hall C linear raster pattern (2002 - )

Fig. 4 Three dimensional density histogram of the Hall C linear raster (2002 - )

LINEAR BEAM RASTER MAGNET DRIVER BASED ON H-BRIDGE TECHNIQUE

1) The United States of America may have certain rights to this invention under Management and Operating contract No. DE-AC05-84ER40150 from the Department of Energy.

FIELD OF THE INVENTION

2) The present invention relates to a system for generating a uniform raster density distribution on a cryogenic target in order to eliminate beam-heating effects.

BACKGROUND OF THE INVENTION

3) Lissajous raster systems used in linear accelerators typically include a resonance driver, which is operating in a high Q resonance loop. The resonance driver typically powers an air-core raster magnet with a sinusoidal current waveform. As the sinusoidal waveform approaches its peak, it slows down at the edge of the scan region in order to reverse direction. At the edges of the scan region, the scanning velocity of the electron beam becomes nearly zero. The slower scanning velocity causes much more beam energy to be deposited along the boundaries and the four corners as shown in the raster density 2D and 3D histograms of FIG. 1 and FIG. 2 respectively.

4) Eventually, as a result of the increase in deposited energy in the boundaries and four corners, overheating occurs in the target material. Experimental measurements, determined by a luminosity scan along with a magnetic spectrometer, show that the luminosity decreases gradually as a result of the increase in beam current. This indicates that a local overheating effect near the boundaries and the corners of a Lissajous raster pattern contributes an uncertainty in the target length, which leads to a negative effect on the accuracy of the experimental data.

5) With the use of the prior art Lissajous raster system as described above, employing a magnet driven by a sinusoidal current waveform, the maximum allowable beam current is limited to about 200 μA to avoid overheating of the target.

6) What is needed is a system for producing a raster pattern for a linear beam having a highly uniform raster density distribution, elimination of target heating by non-uniform raster density distributions, and higher achievable levels of beam current. What is especially desired is a linear beam raster magnet driver that is capable of producing at least 100 A of linear current swing at 25 kHz for use with high-energy accelerator facilities and in applications such as medical therapy by heavy ion, cancer treatment by electron accelerators, ion implantation for semiconductor chip production, and modification of material behavior in material science.

SUMMARY OF THE INVENTION

7) The present invention is an improved raster magnet driver for a linear beam. The linear beam raster magnet driver is based on an H-bridge technique. Four branches, each of which include a power HEXFET, form a two-by-two switch. Switching the HEXFETs in a predetermined order and at the right frequency produces a triangular current waveform. An H-bridge controller controls the switching sequence and timing. The magnetic field of the coil follows the shape of the waveform and thus steers the beam using a triangular rather than a sinusoidal waveform. The system produces a raster pattern having a highly uniform raster density distribution, eliminates target heating from non-uniform raster density distributions, and produces higher levels of beam current.

DESCRIPTION OF THE DRAWINGS

8)

9)

10)

11)

12)

13)

14)

15)

TABLE OF NOMENCLATURE

Figure 1:
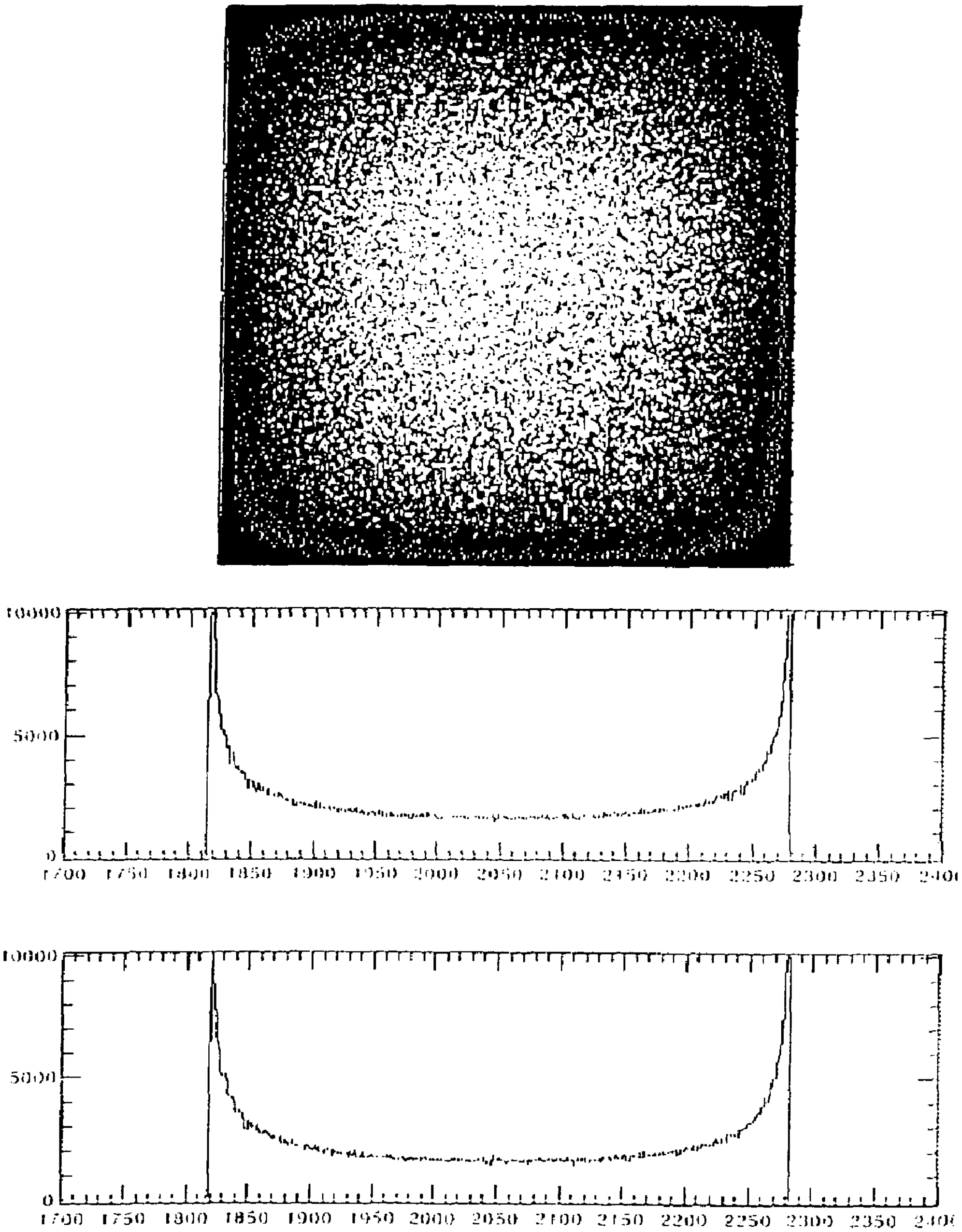
FIG. 1 depicts the x and y profiles of a prior art Lissajous raster pattern used in a linear accelerator.

16) The following is a listing of part numbers used in the drawings along with a brief description:

| Part Number | Description |
|---|---|
| 20 | H-bridge circuit |
| 22 | HEXFET |
| 23A | upper left switch of H-bridge |
| 23B | lower left switch of H-bridge |
| 23C | upper right switch of H-bridge |
| 23D | lower right switch of H-bridge |
| 24 | raster air-core magnet |
| 26 | high voltage power supply |
| 28 | far rails |
| 30 | H-bridge controller |
| 32 | storage capacitor |
| 34 | snubber capacitor |
| 36 | power terminal bus strip |

DETAILED DESCRIPTION

Description of the Present State of the Art:

17) Lissajous raster systems are typically used in linear accelerators to generate a raster density upon a cryogenic target. A critical component in the system is the resonance driver, which is operating in a high Q resonance loop. In the present state of the art, the resonance driver powers an air-core raster magnet with a sinusoidal waveform. As the sinusoidal waveform approaches its peak, it slows down in order to reverse direction at the edge of the scan region. At the edge of the scan region, the scanning velocity of the electron beam becomes nearly zero. This causes much more energy to be deposited along the boundaries and the four corners as shown in the 2D density histogram of FIG. 1 and the 3D density histogram of FIG. 2.

18) The large increase in deposited energy along the boundaries and corners regions eventually causes an undesirable overheating of the target material. Experimental measurements, including a luminosity scan with a magnetic spectrometer, shows the luminosity decreases gradually by the increase of the beam current. This indicates that a local overheating effect near the boundaries and the corners of the Lissajous raster pattern contributes an uncertainty in the target length that, in turn, affects the accuracy of the experimental data.

Figure 2:
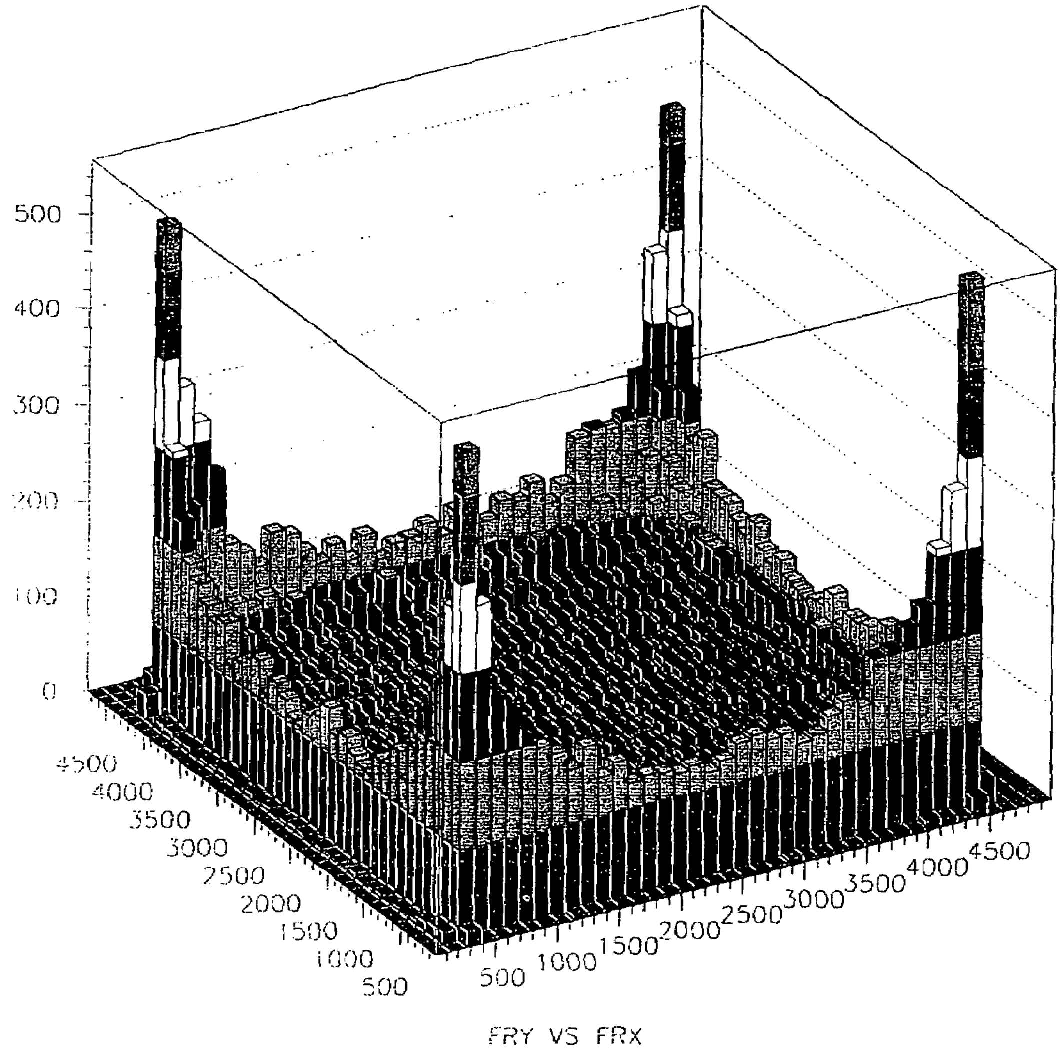
FIG. 2 is a density histogram of the prior art Lissajous raster pattern of FIG. 1.

19) The prior art Lissajous raster system, of which the density histograms are shown in FIGS. 1 and 2, limits the maximum allowable beam current to about 200 μA.

Figure 5:
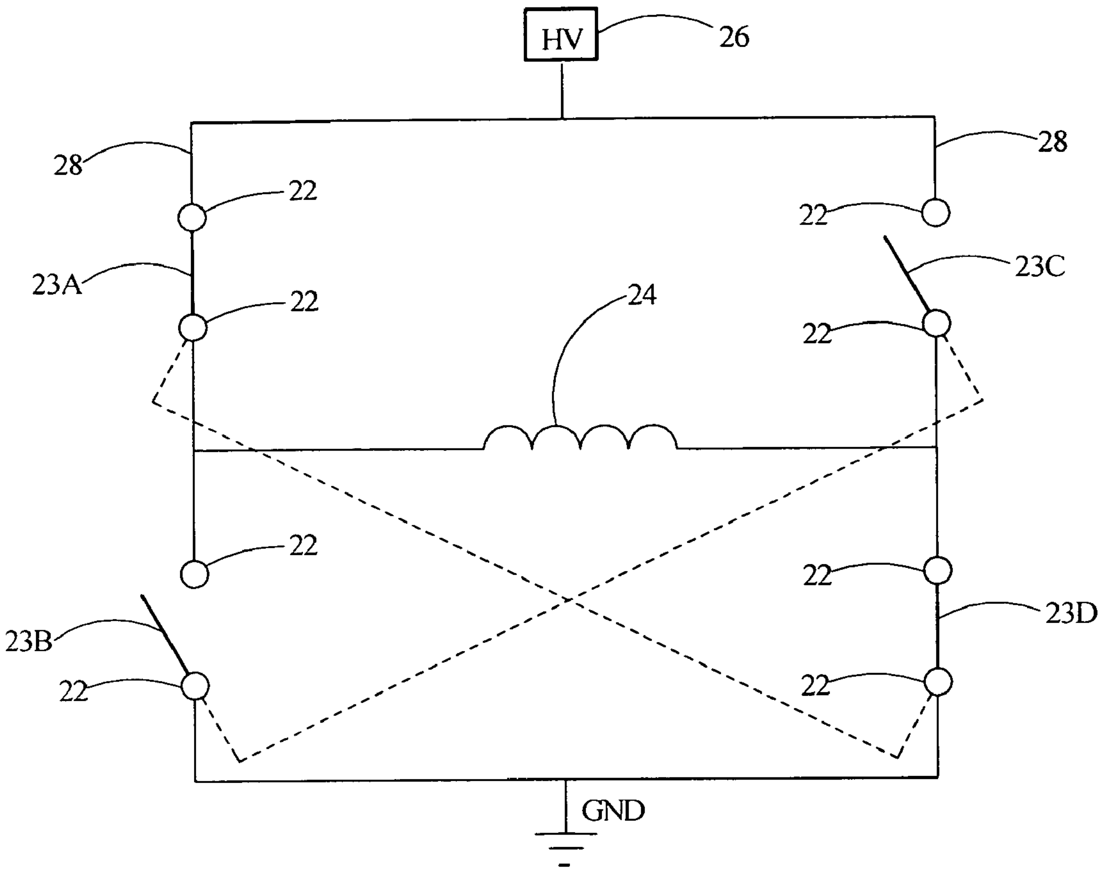
FIG. 5 is a conceptual diagram of an H-bridge circuit used to produce the Lissajous raster pattern of the present invention.
Figure 6:
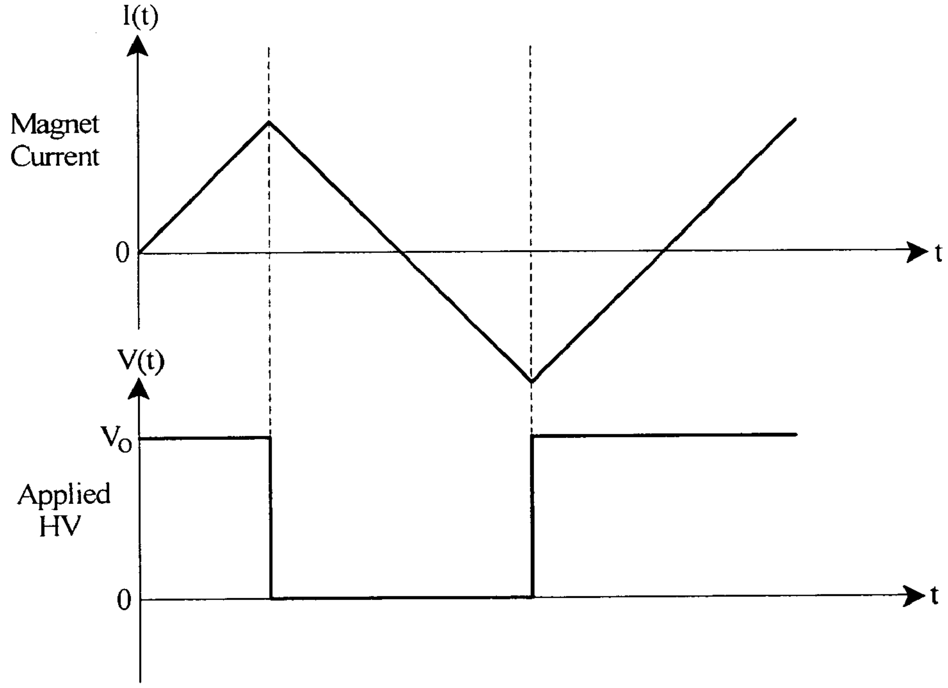
FIG. 6 is a graph of applied voltage and magnet current with time for the H-bridge circuit of FIG. 5.

Description of the Current Invention:

20) The present invention is a linear beam raster magnet driver based on an H-bridge technique. With reference to FIG. 5, the H-bridge 20 consists of four branches of power HEXFETs 22 that form a two by two switch. The four branches of the H-bridge 20 include an upper left 23A, lower left 23B, upper right 23C, and lower right 23D switch. As denoted by the dashed lines in FIG. 5, the upper left 23A and lower right 23D switches form a first pair of switches in the two by two switch. Similarly, the lower left 23B and upper right 23C switches form a second pair of the two by two switch. The two by two switch is controlled by switching the two pairs of switches at the same time. Thus, if the first pair 23A, 23D of switches is closed, as shown in FIG. 5, then the second pair 23B, 23C of switches is open. The raster air-core magnet 24 is located at the center of the H-bridge 20. A high voltage power supply 26 powers the two far rails 28 of the switch. By switching the HEXFETs 22 in the right order and at the right frequency a triangular waveform is generated. An H-bridge controller 30, see FIG. 8, sets the timing property of the switch and can operate in internal and external mode. At the proper time, the H-bridge controller 30 will send a signal to the two by two switch, changing the state of the first pair 23A, 23D of switches to open and at the same time changing the state of the second pair 23B, 23C of switches to closed. The magnetic field of the coil follows the shape of the current waveform and thus steers the beam using a triangular waveform rather than a sinusoidal waveform.

Figure 3:
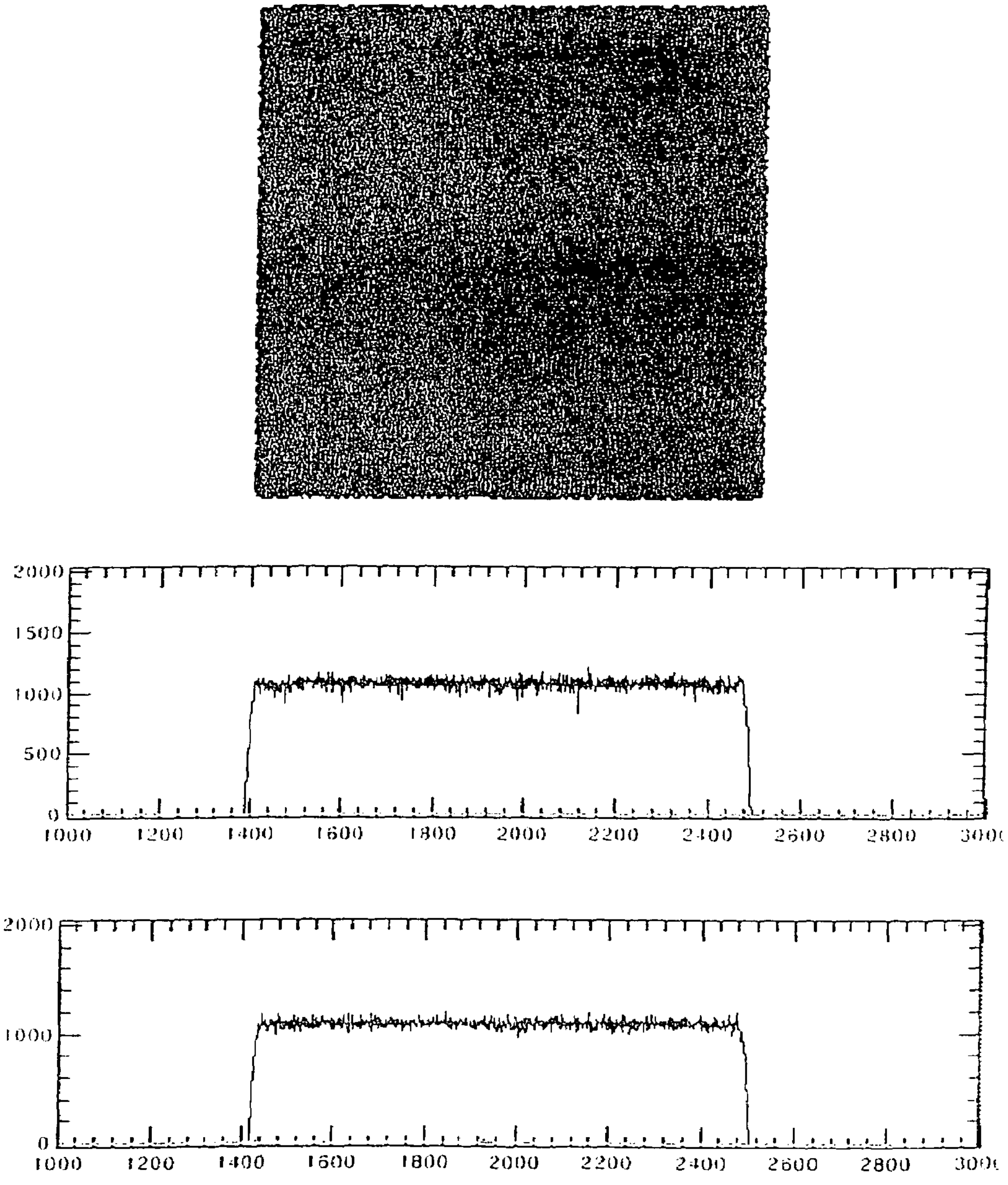
FIG. 3 depicts x and y profiles of a Lissajous raster pattern in a linear accelerator produced by the linear beam raster magnet driver of the present invention.
Figure 4:
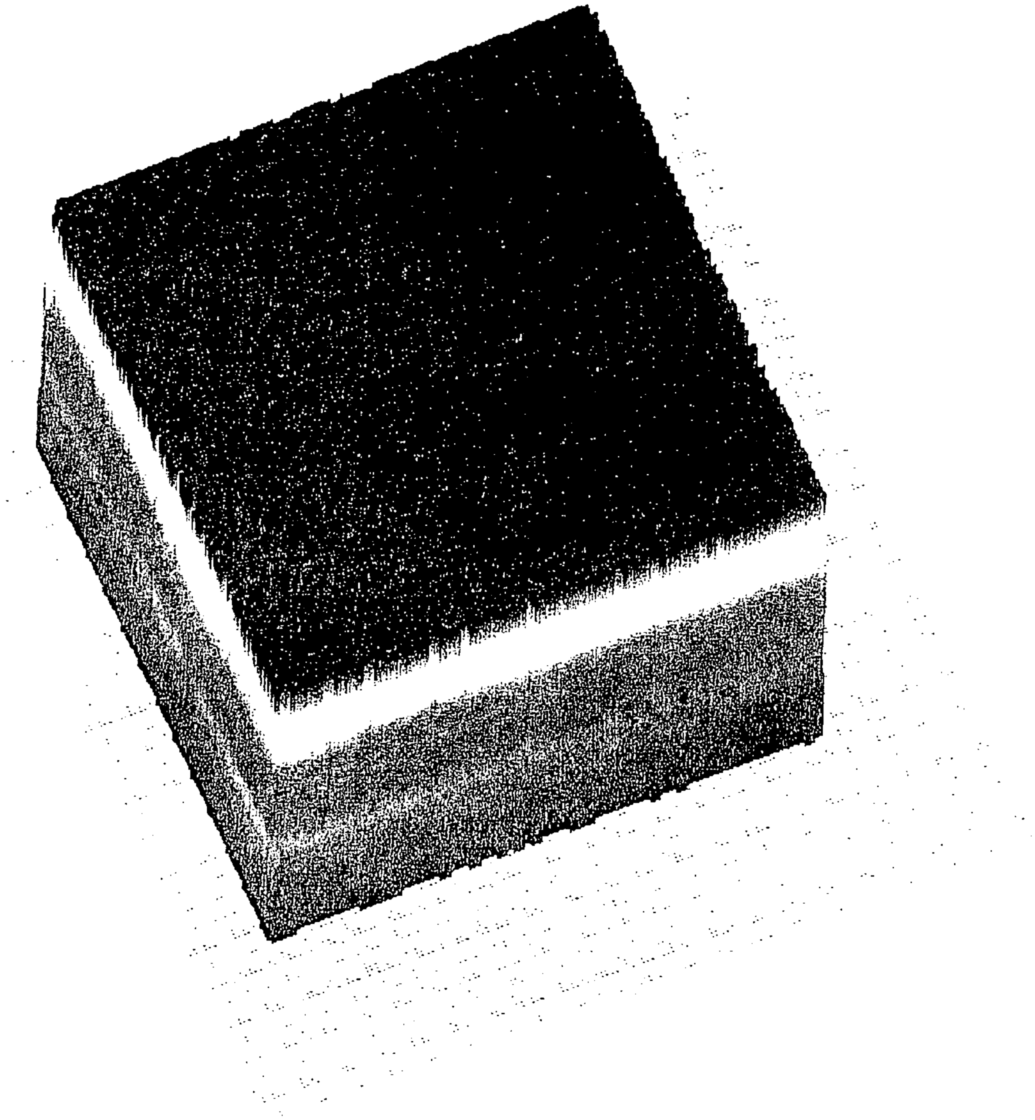
FIG. 4 is a density histogram of the Lissajous raster pattern in a linear accelerator produced by the linear beam raster magnet driver of the present invention.

21) As shown in FIGS. 3 and 4 for the current invention, the raster density profile is vastly improved over the prior art Lissajous raster system. The plots in FIGS. 3 and 4 were obtained from a pickup signal from the magnetic field of the raster magnet. Compared to a Lissajous raster, the invention provides a highly homogenous raster density distribution with 98% linearity and 95% uniformity. The linear sweep velocity is a constant 1000 m/s. The turning time at the raster peak is about 50 ns. Considering the beam traveling time from edge to edge of the raster pattern is 20 μs, the scan turning time of the linear beam magnet driver of the present invention is almost negligible.

22) Based on the key parameters of the linear beam magnet driver as described above, the deposit beam energy in target material is uniformly distributed over the entire raster area without any enhancement at certain regions. The linear beam scan velocities in the two directions, x and y, are kept as high as possible to ensure the scanning beam travels the largest area at unit time in order to eliminate the local heating effectively.

Figure 7:
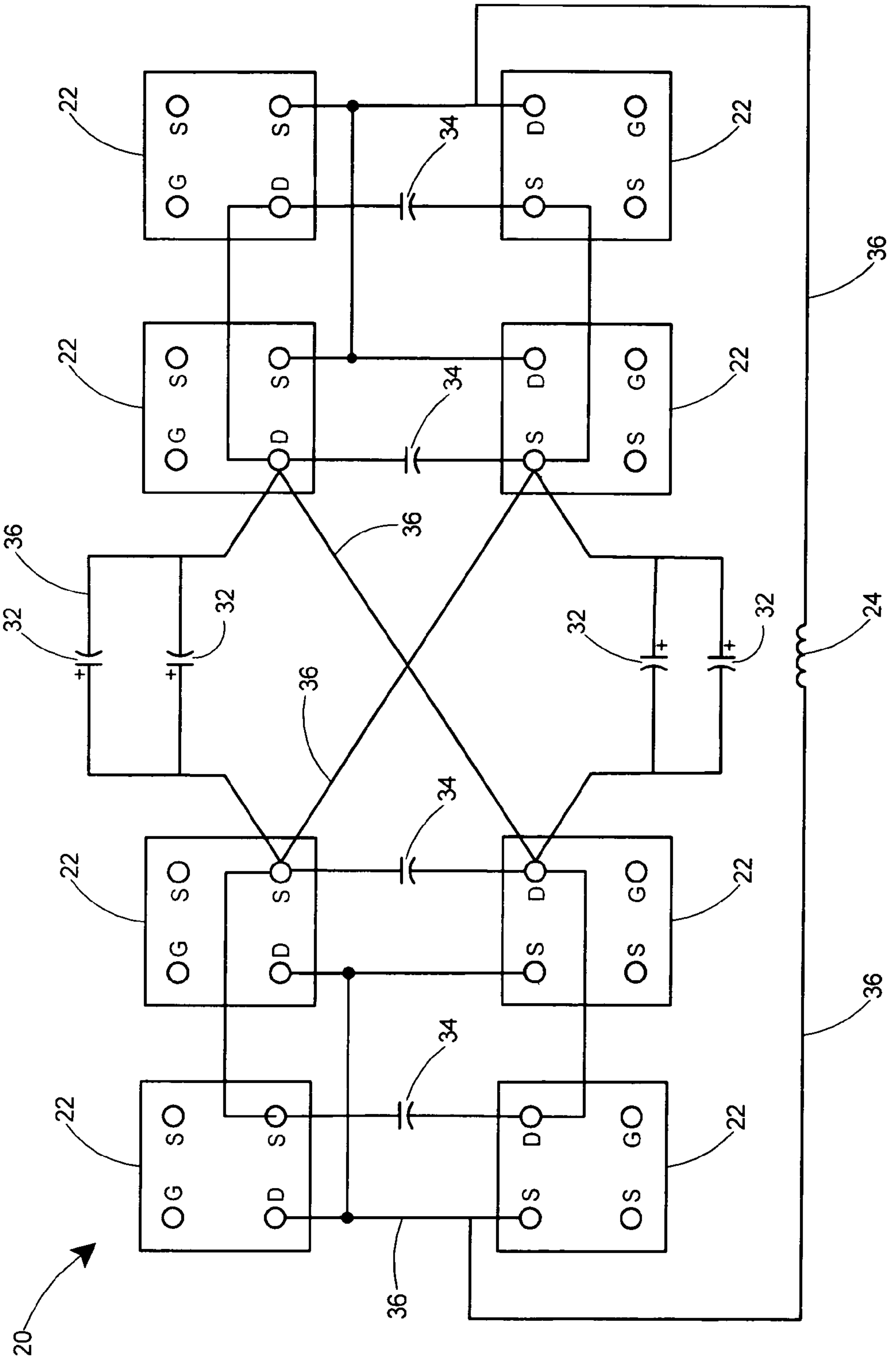
FIG. 7 is a schematic diagram showing the mechanical configuration of the linear beam magnet driver according to the present invention.

23) The H-bridge 20, as shown in FIG. 7, includes eight separate HEXFETs 22. Each HEXFET 22 is preferably an n-channel HEXFET power MOSFET module type FA57SA50LC manufactured by International Rectifier Corporation of El Segundo, Calif. Storage capacitors 32 and polypropylene snubber capacitors 34 are used to build the H-bridge 20. The H-bridge 20 includes power terminal bus strips 36 between the HEXFETs 22. The terminal bus strips 36 or electrical pathways are constructed of silver-plated thick copper. Under this construction, the high voltage spikes caused by the system's parasitic coupling are significantly suppressed thereby creating a reliable high voltage and high current switch. Preferably the copper strips are 2 mm thickness or greater. By eliminating wire for the inner connections between all key components of the H-bridge 20, high voltage spikes due to parasitic inductance are significantly suppressed. All electrical pathways 36 connecting the HEXFETs, the raster air-core magnet 24, the high voltage power supply 26, and the H-bridge controller 30 are strips constructed of silver-plated thick copper.

Figure 8:
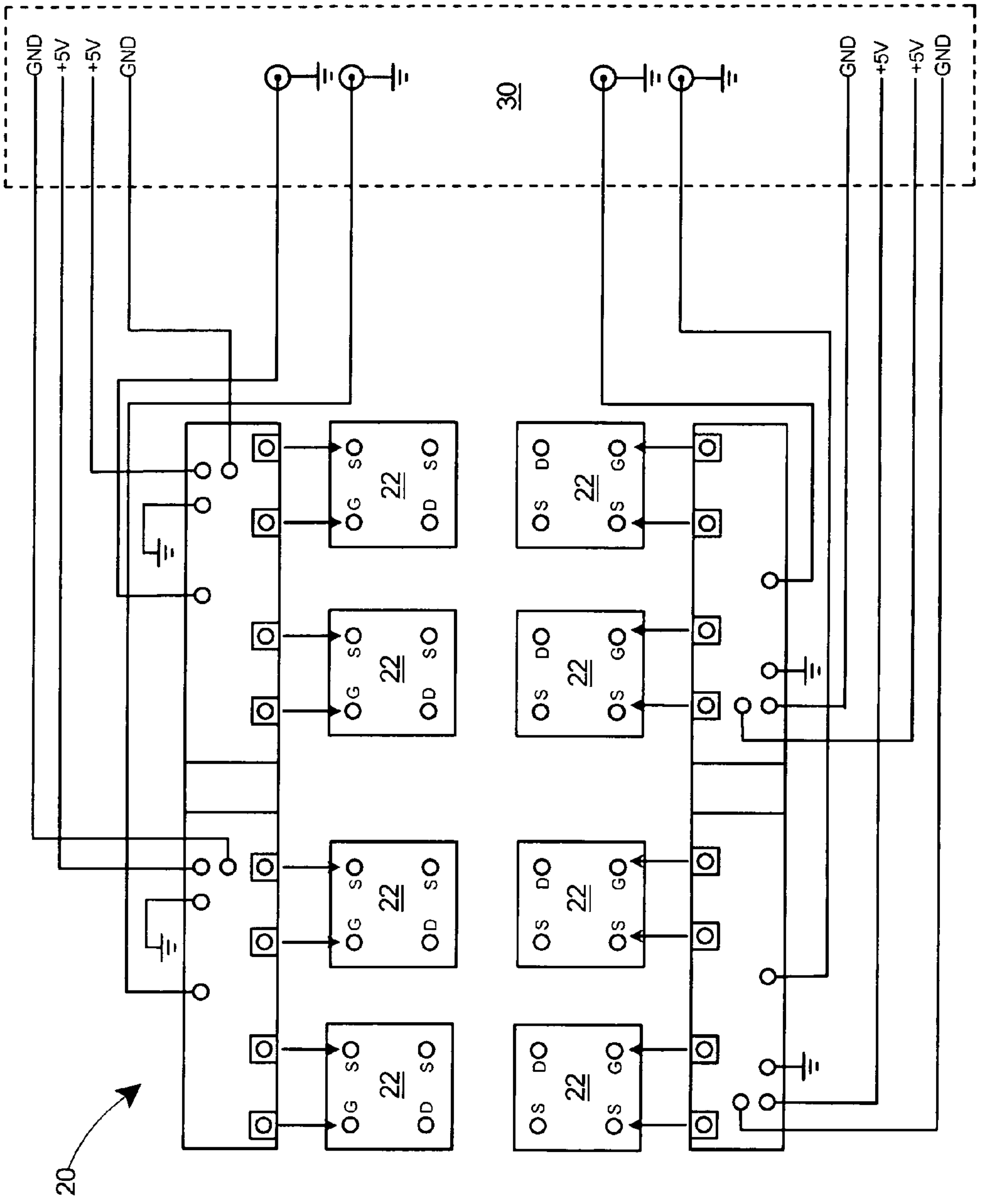
FIG. 8 is an assembly diagram of the linear beam magnet driver of FIG. 7.

24) Referring to the assembly diagram of FIG. 8, the H-bridge controller 30 generates the proper waveform and ensures reliable operation of the H-bridge 20. Use of the linear beam raster magnet driver of the current invention in a high-energy accelerator yielded 100 A of linear current swing at 25 kHz. A triangular waveform is generated as the H-bridge controller 30 switches the HEXFETs 22 in the desired order and at the desired frequency. The H-bridge controller 30 sets the timing property of the switches and can operate in internal and external mode. The magnetic field of the coil follows the shape of the current waveform and thus steers the beam using a triangular waveform rather than a sinusoidal waveform.

25) A phase lock (PLL) technique was used with the H-bridge controller 30. It has a large tolerance for any sudden changes in operational conditions. As an example, as the external trigger frequency disappears, the controller turns to the internal crystal oscillator yy automatically and smoothly with a response time of about 10 ms. Similar automatic functions are also established for power failure and other interruptions to give the driver protection against any external interruption.

26) A special raster frequency ratio of 1.00481, determined by a series of experimental observations, is applied to secure the best stability and uniformity of the raster pattern. This allows the two drivers, x and y, to operate at the highest frequencies.

27) The highly uniform density distribution of the beam scanning (uniform irradiation) in this invention has potential applications in fields other than high energy accelerators, including medical therapy by heavy ion, electron accelerators for cancer treatment, ion implantation for semiconductor chip production, and modification of material behavior in material science.

28) As the invention has been described, it will be apparent to those skilled in the art that the same may be varied in many ways without departing from the spirit and scope of the invention. Any and all such modifications are intended to be included within the scope of the appended claims.

What is claimed is:

1. A system for producing a highly homogenous raster density distribution having at least 98% linearity and at least 95% uniformity at a high energy level of at least 100 A of linear current swing at 25 kHz comprising:

an H-bridge circuit including a center portion and four ends;

four branches of power HEXFETs forming a two by two switch;

a raster air-core magnet at said center portion;

a high voltage power supply connected at two of said four ends;

an H-bridge controller connected to said HEXFETs;

electrical pathways connecting said HEXFETs, said raster air-core magnet, said high voltage supply, and said H-bridge controller; and said H-bridge controller capable of switching said HEXFETs in an order and at a frequency to produce a triangular current waveform having a constant linear sweep velocity and a minimum turning time at the waveform peak.

2. The system of claim 1 wherein said constant linear sweep velocity is 1000 m/s.

3. The system of claim 2 wherein said minimum turning time at the waveform peak is 50 ns.

* * * * *